May 28, 1935. E. E. DUFF 2,003,255
WIRE LINE SHOCK ABSORBER
Filed March 12, 1934 2 Sheets-Sheet 2

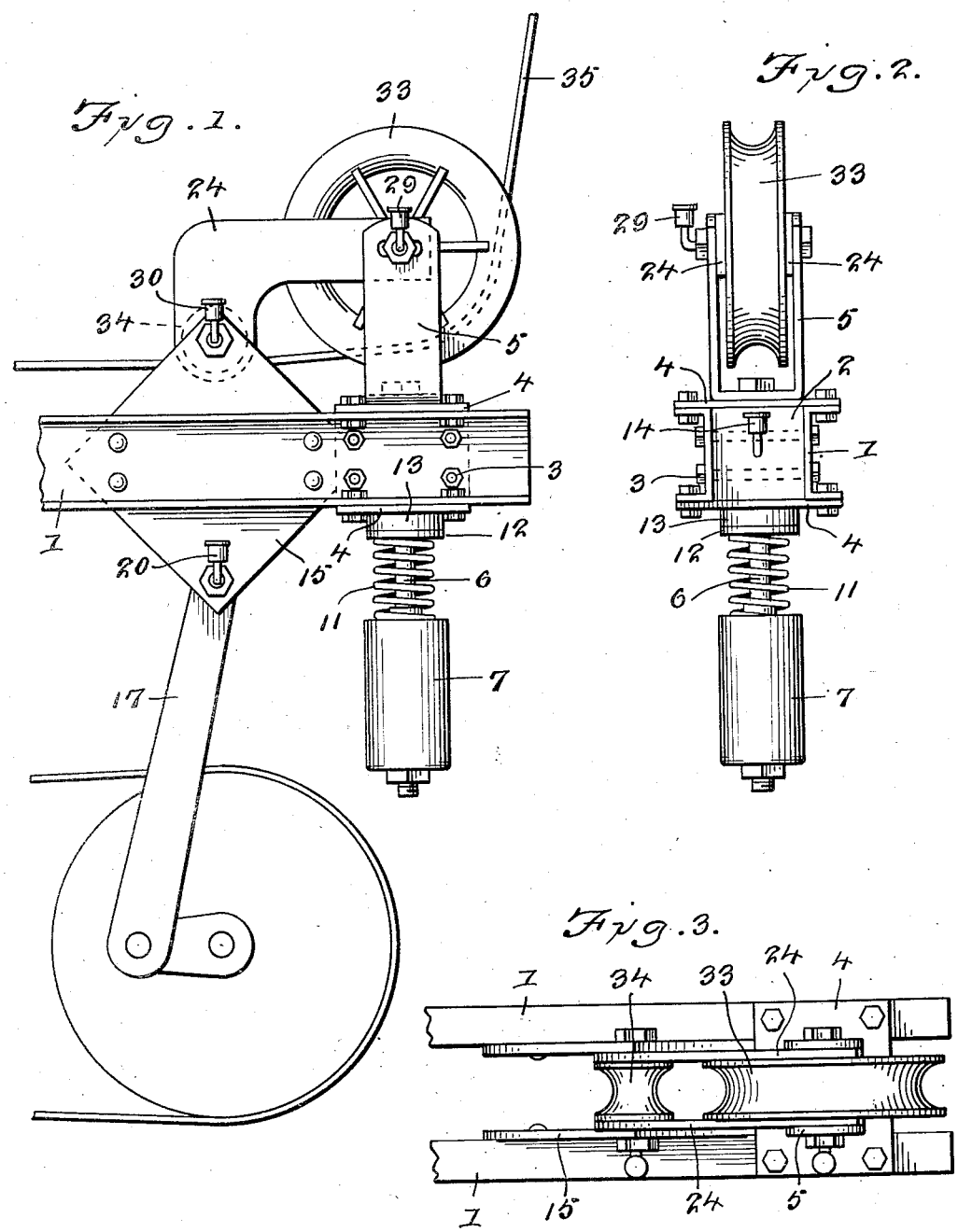

Elmo E. Duff
INVENTOR
BY Victor J. Evans & Co.
ATTORNEY

Patented May 28, 1935

2,003,255

UNITED STATES PATENT OFFICE 2,003,255

WIRE LINE SHOCK ABSORBER

Elmo E. Duff, Jennings, Okla.

Application March 12, 1934, Serial No. 715,250

4 Claims. (Cl. 255—16)

This invention relates to well drilling machines, and its general object is to provide a shock absorber primarily designed for use with drilling rigs employing wire drilling lines, that will minimize vibration and shocks on the rig and derrick, which of course will prolong the life thereof and increase the efficiency of the drilling apparatus in its entirety as well as permits the use of relatively stiff wire lines which would be practically impossible without the shock absorber.

Another object of the invention is to provide a wire line shock absorber that can be associated with all types of rigs and will not only have a tendency to prevent the drilling tool from becoming stuck, but when such takes place, will loosen the same in an expeditious manner, without stopping the rig or causing damage thereto.

A further object of the invention is to provide a wire line shock absorber that includes the use of both a coil spring and rubber to bring about the necessary absorbing qualities, and the device likewise gives the necessary whip to the line.

A still further object of the invention is to provide a device of the character set forth, that is simple in construction, inexpensive to manufacture, easy to install, and is extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of the device which forms the subject matter of the present invention applied to a drilling rig.

Figure 2 is a front view of the device.

Figure 3 is a top plan view.

Figure 4:
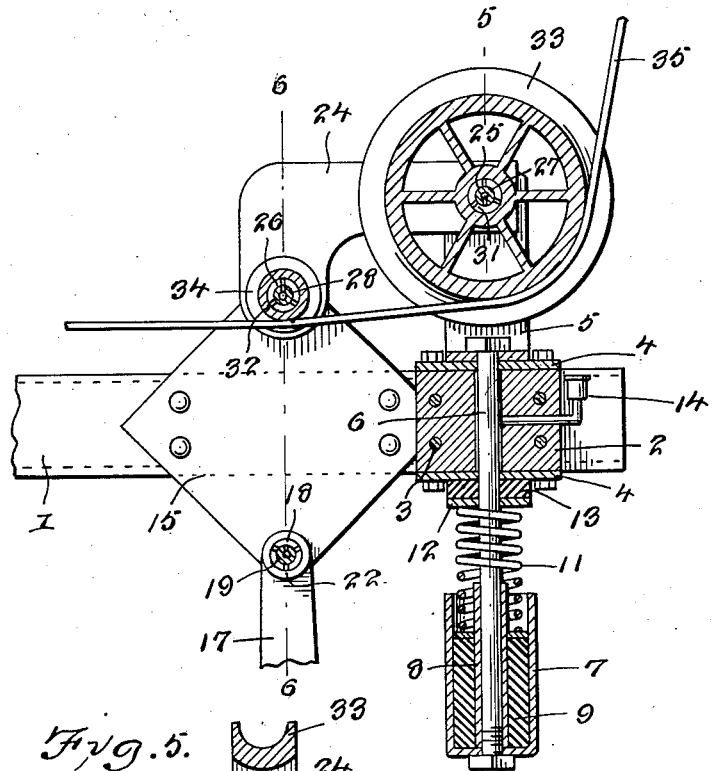
Figure 4 is a view somewhat similar to Figure 1, with parts in section.

Referring to the drawings in detail, the reference numeral 1 indicates the walking beam of the drilling rig and which as shown includes a pair of flanged sections disposed in spaced relation with respect to each other with the flanges arranged outermost as best shown in Figure 2.

Disposed between the flanged sections and adjacent the free ends thereof is a block 2 which is preferably made from wood, and is held in fixed relation through the instrumentality of bolt and nut connections 3, the bolts of which extend through the sections, as clearly shown in Figure 4. Bolted to the sections and arranged upon the top and bottom of the block 2, are plates 4.

Resting upon the upper plate 4 is the bight portion of a substantially U-shaped bracket 5 which is held associated with the walking beam 10 through the instrumentality of a relatively long bolt 6 that is mounted for slidable movement through the plates 4 and block 2. The bolt 6 extends a considerable distance below the walking beam and for distinction may be termed the shock bolt.

Figure 5:
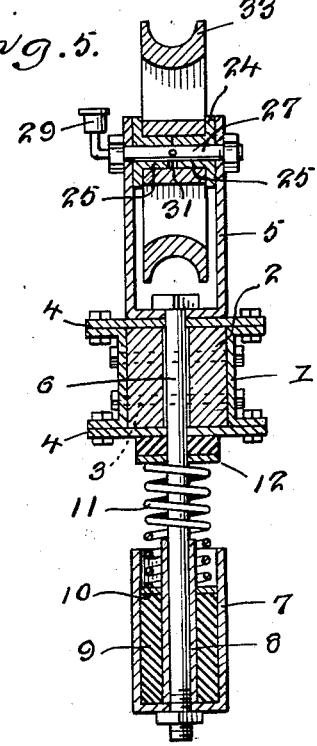
Figure 5 is a sectional view taken approximately on line 5—5 of Figure 4.

Carried by the bolt 6 is a cylinder 7 that is provided with a closed bottom having an opening therein for the passage of the bolt 6, and the cylinder rests upon a nut threaded to the lower end of the bolt, as best shown in Figure 5. A sleeve 8 surrounds the bolt 6 and is disposed within the cylinder 7 which likewise has arranged therein a collar 9 that is formed from resilient material such as rubber, and surrounds the sleeve.

Disposed about the sleeve 8 and resting upon the resilient collar 9 is a washer 10 that provides the abutting means for the lower convolution of a coil spring 11, which likewise surrounds the bolt 6 and sleeve 8, and the upper convolution engages a washer 12, that is spaced from the lower plate 4 through the instrumentality of a block 13 of resilient material such as rubber.

While the bracket 5 is secured to the walking beam, it will be apparent from the structure just described that it will give due to the resilient mounting and the fact that the bolt is slidable through the block 2. In order to prevent undue friction, I provide lubricating means for the bolt 6, and which includes a grease cup 14 that is arranged in communication with the bore of the block as clearly shown in Figure 4.

Figure 6:
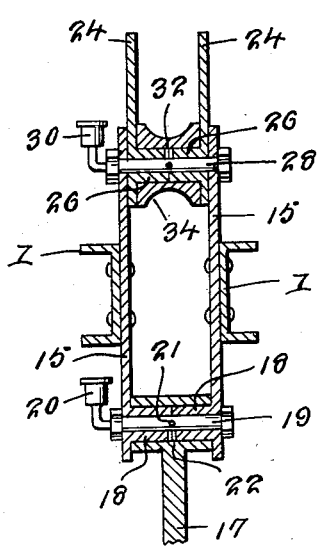
Figure 6 is a sectional view taken approximately on line 6—6 of Figure 4.

Vertically arranged between the flanged sections of the walking beam is a pair of similarly shaped plates 15 which are secured to the sections by rivets or the like which pass through the plates adjacent to two opposed corners thereof, and the sections. Journaled between the lower corners of the plates 15 is the upper end of a pitman 17, and the journal means in the form as shown includes a pair of inwardly directed collars 18 that are formed with the plates 15 and which have their inner ends disposed in contacting engagement as best shown in Figure 6. A hollow pin 19 passes through the collars 18 and connected to the pin for communication with the bore thereof is a grease cup 20 for supplying lubricant to the journal through the medium of openings 21 in the pin and bores 22 arranged in the confronting ends of the collars, as clearly shown in Figure 6.

Pivotally secured to the upper corners of the plates 15 are the lower ends of bell crank arms 24 which have their upper ends pivotally secured between the upper ends of the arms of the U-shaped bracket 5, and each of the ends of the bell crank levers have inwardly extending therefrom collars arranged in confronting pairs which are indicated by the reference numerals 25 and 26. Extending through the pairs of collars 25 and 26 are pins 27 and 28 which are provided with lubricant passages, and the passages are furnished with lubricant through the medium of grease cups 29 and 30.

The pairs of collars 25 and 26 have disposed in their confronting ends, recesses to provide bores 31 and 32, that radiate from the bores that receive the hollow pins, as clearly shown in Figures 5 and 6. The pins are of course provided with means for holding them in fixed relation such as nuts as shown, and the pin 27 is mounted in horizontally disposed slots arranged in the arms of the U-shaped bracket 5, so as to allow movement of the bracket and bell crank arms 24.

The pairs of collars 25 have journaled thereon a relatively large sheave or spudding pulley 33, while the pair of collars 26 have journaled thereon a relatively small sheave or pulley 34, and the sheaves 33 and 34 have trained thereabout the wire line 35. The wire line after leaving the sheave 34 is directed about a sheave, not shown and is thence connected to the usual wire line drum, while the wire line beyond the sheave 33 is disposed about the pulley at the upper end of the derrick, not shown.

From the above description and disclosure of the drawings, it will be obvious that I have provided a shock absorber for a drilling machine that employs a wire line, that will eliminate shocks and reduce vibration to a minimum, and therefore will not only materially increase the efficiency of the machine, but will prolong the life thereof.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a shock absorber for the line of a well drilling machine including a walking beam, guiding means for the line and including a pair of pulleys, a substantially U-shaped bracket having one of said pulleys journaled between the arms thereof, means for slidably and resiliently mounting the bracket with respect to the walking beam, bell crank arms having one of their ends pivotally connected to the bracket, means fixed to the walking beam and having the opposite ends of the bell crank arms pivotally connected thereto, and said fixed means having the other pulley journaled thereto.

2. In a shock absorber for the line of a well drilling machine including a walking beam, guiding means for the line and including a pair of pulleys, a substantially U-shaped bracket having one of the pulleys journaled between the arms thereof, a bolt slidably mounted with respect to the walking beam, resilient means carried by the bolt and cooperating therewith for securing the bracket to the walking beam, means fixed to the walking beam and having the other pulley journaled thereto, and bell crank arms pivotally connected to the last mentioned means and the bracket respectively.

3. In a shock absorber for the line of a well drilling machine including a walking beam and its pitman, guiding means for the line and including a pair of pulleys, a substantially U-shaped bracket for one of said pulleys, means for slidably and resiliently mounting the bracket with respect to the walking beam, plates fixed to the walking beam and having the other pulley and the pitman journaled thereto, bell crank arms pivotally connected to the plates and bracket respectively, and means for lubricating the pulleys and the bracket mounting means.

4. In a shock absorber for the line of a well drilling machine including a walking beam, guiding means for the line and including a pair of pulleys, a substantially U-shaped bracket for one of said pulleys, a bolt slidably mounted with respect to the walking beam, shock absorbing means including elastic material and a coil spring carried by the bolt, said shock absorbing means and bolt cooperating for securing the bracket with respect to the walking beam, plates secured to the walking beam and having the other pulley journaled with respect thereto, and bell crank arms pivotally connected with respect to the plates and the bracket respectively.

ELMO E. DUFF.